Patented Oct. 6, 1931

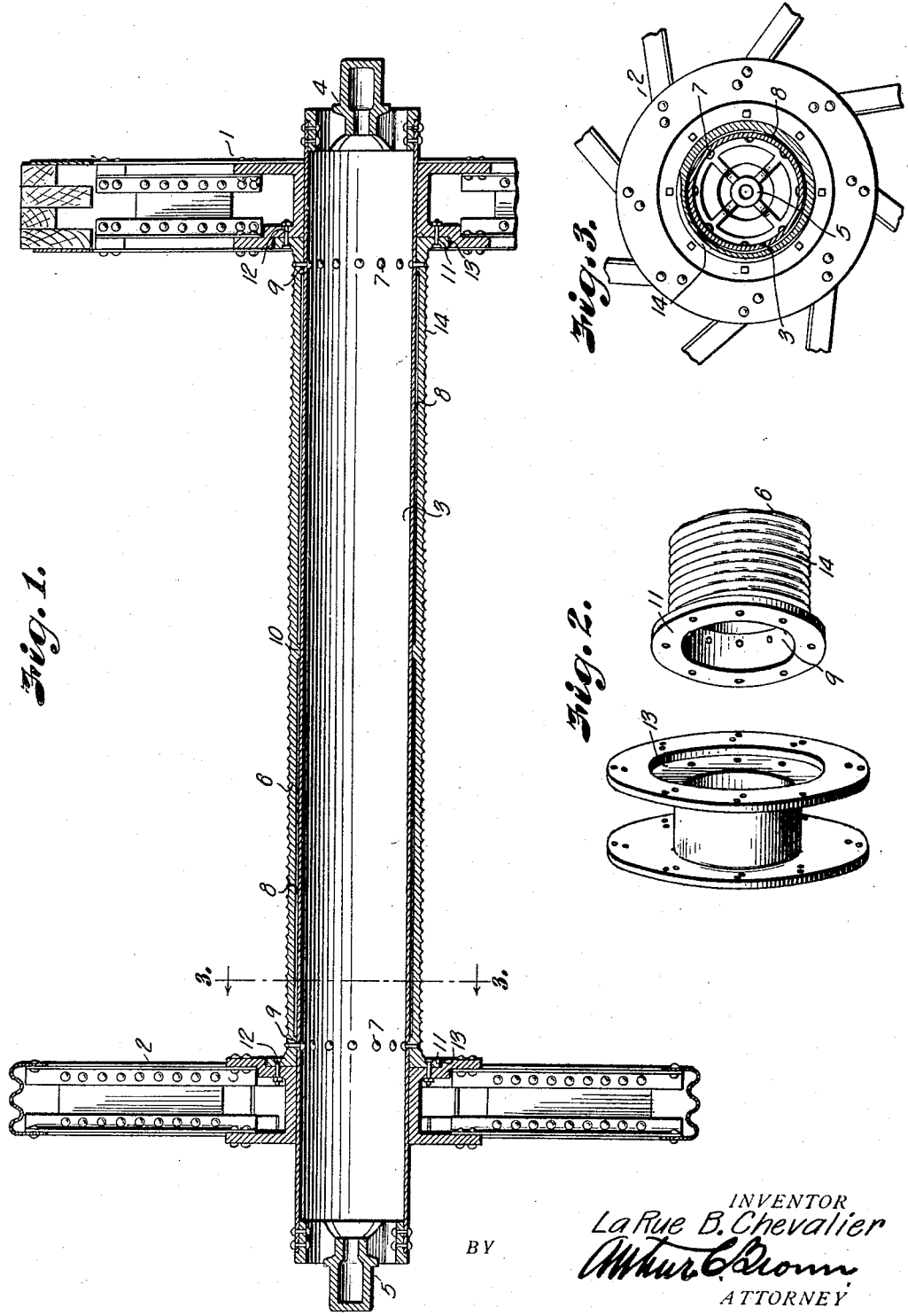

1,825,714

UNITED STATES PATENT OFFICE

LA RUE B. CHEVALIER, OF IOLA, KANSAS

REENFORCING SLEEVE FOR BULL AND CALF WHEEL SHAFTS

Application filed October 17, 1929. Serial No. 400,306.

My invention relates to bull wheels including brake wheels and sheave wheels connected by iron pipes and has for its principal object to reenforce the connecting pipe, to stiffen the pipe against bending and crushing strains, to provide means integral with the reenforcing member for attaching the hubs of brake and sheave wheels, and to strengthen the connections between elements of a bull wheel.

In accomplishing these and other objects of the invention, I have provided improved details of structure, the preferred forms of which are illustrated in the accompanying drawings, wherein:

Fig. 1 is a vertical longitudinal section through a bull wheel constructed in accordance with my invention, the brake wheel being shown fragmentarily.

Fig. 2 is a perspective view of the hub of one wheel member adapted to receive the reenforcing sleeve and the end of the reenforcing sleeve adapted to be mounted in the hub.

Fig. 3 is a section on the line 3—3, Fig. 1.

Referring in detail to the drawings:

1 and 2 designate respectively a brake wheel and a sheave wheel connected by a pipe 3 to form a bull wheel.

The connecting member in bull wheels as ordinarily constructed comprises a wrought iron pipe having ends projecting beyond the brake wheel and sheave wheel and provided with gudgeons 4 and 5 riveted to the ends of the pipe for mounting the bull wheel rotatively on a suitable support.

In ordinary practice the pipe is fixed in hubs of the wheel so that application of braking influence to the brake may serve to brake the sheave wheel. The pipe is subject to bending and crushing and it is, of course, necessary that the pipe be securely attached to the wheels.

In order to reenforce and strengthen the pipe I mount a reenforcing sleeve 6 comprising preferably an integral cast iron tube on the pipe and secure the same to the pipe by rivets 7.

To facilitate mounting of the tubular reenforcing member on the pipe while retaining the ability of the sleeve to reenforce the pipe I form recesses 8 comprising preferably annular grooves in the interior periphery of the sleeve leaving end bosses 9 comprising undisturbed portions of the inner periphery of the sleeve, at the ends thereof, and intermediate bosses 10 whereby the sleeve engages the pipe at a plurality of points and bending or crushing strains applied to the combined sleeve and pipe element are largely resisted by the sleeve and relatively small bending strains are transmitted to the pipe.

The sleeve is mounted on the pipe at a suitable position to extend the entire distance from the brake wheel to the sheave wheel and I preferably provide flanges 11 at the ends of the sleeve for face to face engagement with the hubs of the brake and sheave wheels and secure the flanges to the hubs by bolts 12.

I further preferably provide hubs of special construction to receive the ends of the reenforcing sleeve having annular recesses 13 around the hub openings forming seats for the end flanges of the sleeve.

The flange seats or recesses may be formed by offsetting a rim portion of one flange of a hub to form both the recess for the flange and an interior recess spaced radially from the flange seat to receive the inside spoke of the wheel. The sleeve is provided with peripheral spiral grooves 14 to receive the cable operated by the bull wheel.

In assembling a bull wheel comprising elements constructed as described, the sleeve may be mounted on the pipe with relative ease because of the recesses in the inner surface thereof and located at a suitable position for spacing the brake and sheave wheels in desired relation with the ends of the pipe.

The sleeve may be securely attached to the pipe by rivets extending through the bosses of the sleeve into the pipe. The wheels may then be mounted on the pipe and secured to the end flanges of the sleeve.

The bosses in the sleeve are adapted to engage the outer surface of the pipe firmly. The sleeve serves to reenforce the pipe and also to securely connect the brake and wheels in spaced relation whereby tortional strains due to application of the brake are largely absorbed by the cast iron sleeve while the wrought iron pipe serves to support the bull wheel.

What I claim and desire to secure by Letters Patent is:

1. A bull wheel including a brake wheel, a sheave wheel, a pipe, the brake and sheave wheels having hubs receiving the pipe for connecting the wheels, said hubs being provided with facing sockets and a reenforcing member comprising a sleeve mounted on said pipe and provided with flanges seated in said sockets and connected to the hubs.

2. In a device of the character described including a brake wheel, a sheave wheel and a pipe rigidly fixed to said wheels and connecting the same, and a reenforcing sleeve mounted on said pipe having flanges fixedly connected to said wheels.

3. A bull wheel including a brake wheel, a sheave wheel, a pipe, the brake and sheave wheels having hubs receiving the pipe for connecting the wheels, said hubs being provided with facing sockets, and a reenforcing member mounted on said pipe and provided with flanges seated in said sockets and connected to the hubs.

4. A bull wheel including a brake wheel, a sheave wheel, and a pipe, the brake and sheave wheels having hubs receiving the pipe for connecting the wheels, said hubs being provided with annular facing sockets, and a reenforcing member comprising a sleeve mounted on said pipe and provided with flanges seated in said sockets and connected to the hubs.

5. In a bull wheel including a brake wheel, a sheave wheel, and a member connecting the wheels, a reenforcing member comprising an integral tubular sleeve mounted on the connecting member having cut-away portions forming spaced bosses engaging the pipe, and means including rivets extending through said bosses for securing the sleeve to the bull wheel.

6. In a bull wheel including a brake wheel, a sheave wheel, and a member connecting the wheels, a reenforcing sleeve mounted on said connecting member having cut-away portions forming spaced end and intermediate bosses engaging the connecting member, flanges on the ends of said sleeve, means for securing said flanges respectively to the brake and sheave wheels, and means for securing the sleeve to the connecting member.

In testimony whereof I affix my signature.

LA RUE B. CHEVALIER.